United States Patent
Roll et al.

[11] Patent Number: 5,603,870
[45] Date of Patent: *Feb. 18, 1997

[54] OPTICAL FIBER CONNECTOR TECHNIQUES

[75] Inventors: Richard A. Roll, West Trenton; Muhammed A. Shahid, Ewing Township, Mercer County; George J. Shevchuk, Old Bridge, all of N.J.

[73] Assignee: Lucent Technologies Inc., Murray Hill, N.J.

[ * ] Notice: The term of this patent shall not extend beyond the expiration date of Pat. No. 5,287,426.

[21] Appl. No.: 288,111

[22] Filed: Aug. 10, 1994

Related U.S. Application Data

[63] Continuation of Ser. No. 186,935, Jan. 27, 1994, Pat. No. 5,388,174, which is a continuation-in-part of Ser. No. 20,931, Feb. 22, 1993, Pat. No. 5,287,426.

[51] Int. Cl.⁶ .................................................. B29D 11/00
[52] U.S. Cl. .......................... 264/1.25; 156/92; 264/2.5; 385/80
[58] Field of Search .................................. 385/80, 85, 59, 385/71, 83; 156/625, 629, 92; 264/1.25, 2.5, 22; 29/446, 453

[56] References Cited

U.S. PATENT DOCUMENTS

| | | | |
|---|---|---|---|
| 3,632,695 | 1/1972 | Howell | 264/2.5 |
| 4,818,058 | 4/1989 | Bonanni | |
| 5,013,494 | 5/1991 | Kubo et al. | 264/2.5 |
| 5,019,301 | 5/1991 | Coden et al. | 264/1.25 |
| 5,034,170 | 7/1991 | Briggs, Jr. et al. | 264/1.25 |
| 5,071,597 | 12/1991 | D'Amato et al. | 264/2.5 |
| 5,259,051 | 11/1993 | Burack et al. | 385/76 |
| 5,268,981 | 12/1993 | Shahid | 385/71 |
| 5,388,174 | 2/1995 | Roll et al. | |

FOREIGN PATENT DOCUMENTS 62-161532  7/1987  Japan ..................... 264/2.5

OTHER PUBLICATIONS

"Plastics Engineering Handbook of the Society of the Plastics Industry, Inc.," Michael L. Berins, editor, Van Nostrand Reinhold, New York, 1991, pp. 179–232.

Western Electric Technical Digest, "Holding Fixture For Optical Fiber Array Connectors", No. 52, Oct. 1978.

*Primary Examiner*—Mathieu D. Vargot
*Attorney, Agent, or Firm*—Lester H. Birnbaum

[57] ABSTRACT

Optical fiber support members (30 and 31) are formed by making an array of V-grooves (25) in a monocrystalline material (26), depositing metal (27) on the array, and removing the metal member to provide an insert. The insert is used to form the support members by injection molding.

7 Claims, 4 Drawing Sheets

OPTICAL FIBER CONNECTOR TECHNIQUES

This is a continuation of application Ser. No. 08/186,935 filed Jan. 27, 1994, now U.S. Pat. No. 5,388,174; which in turn is a Continuation-in-Part of the U.S. patent application of M. A. Shahid, Ser. No. 08/020,931 filed Feb. 22, 1993 and now U.S. Pat. No. 5,287,426.

TECHNICAL FIELD

This invention relates to optical fiber interconnections and, more particularly, to techniques for making optical connections to optical backplanes and optical fiber ribbons.

BACKGROUND OF THE INVENTION

The U.S. patent of M. A. Shahid, U.S. Pat. No. 5,268,981, granted Dec. 7, 1993 (hereinafter '981) describes a method for applying optical fiber connectors to optical backplanes of the type comprising optical fibers routed on a flexible plastic substrate. The optical fibers of each of the output tabs or output ports are contained between a pair of optical fiber support members on opposite sides of the fibers. The support members are made of a monocrystalline material, such as silicon, in which opposing V-grooves are made by photolithographic masking and etching for containing the fibers. It is essential that the optical fibers be contained at precise locations by the support members of a connector so that the optical fibers of another connector can be abutted against them such that light can be efficiently transmitted between the abutted fibers. Monocrystalline silicon support members suit this purpose because of the precision with which the V-grooves in such material can be made. The U.S. patent of M. A. Shahid, U.S. Pat. No. 5,287,426, granted Feb. 15, 1994 (hereinafter '426), describes how the same general technique can be used for applying connectors to optical fiber ribbons.

While the techniques of the Shahid '981 patent and the Shahid '426 patent have significantly reduced the time, expense and operator skill needed to provide interconnections to the output ports of optical backplanes and to optical fiber ribbons, forming and applying the connectors still constitutes a significant expense. Further, the silicon connectors are not amenable to automatic or robotic placement, as is desirable for mass production, because of their relative fragility and the difficulty of shaping them along planes that do not correspond to their crystallographic planes. Making V-grooves in each individual support member by photolithographic masking and etching is, of itself, comparatively time consuming.

SUMMARY OF THE INVENTION

The invention is an improvement of a method for applying connectors to a parallel array of optical fibers that are adhered to and extend between first and second displaced substrate portions. The array of optical fibers is contained between a pair of optical support members on opposite sides of the array, and thereafter the support members and optical fiber array are cut transversely to the optical fiber array. The improvement comprises holding the first optical fiber support member in a first fixture having a first alignment aperture and a first alignment pin extending perpendicularly to the optical fiber array. The second support member is held in a second fixture having a second alignment aperture and a second alignment pin also extending perpendicularly to the optical fiber array. When the two support members are clamped on opposite sides of the fiber array, they are aligned by engaging the first alignment pin with the second alignment aperture and engaging the second alignment pin with the first alignment aperture. With the support members clamped, fluid adhesive is applied between the first and second support members and to the optical fibers to bond them permanently together.

An important aspect of the invention is that the first and second support members are made of plastic and are made by plastic molding. As a consequence, a third alignment projection and a third alignment aperture can be made in the first support member, and a fourth alignment projection and a fourth alignment aperture can be made in the opposing face of the second support member. These projections are much smaller than the first and second alignment pins, and when the support members are clamped together, engagement of the third alignment projection with the fourth alignment aperture, and engagement of the fourth alignment projection with the third alignment aperture, gives a finer and more precise degree of alignment. It had been thought previously that it would be difficult to mass produce plastic support members having matching V-grooves of the requisite precision and alignment. By intentionally making the mold slightly larger, in a manner that will be described in more detail later, one can compensate for inherent shrinkage of the plastic and obtain the required precision. Methods for rapidly and repeatedly applying connectors to a number of output ports of an optical backplane will be discussed.

These and other objects, features and advantages of the invention will be better understood from a consideration of the following detailed description taken in conjunction with the accompanying drawing.

DETAILED DESCRIPTION

Figure 1:
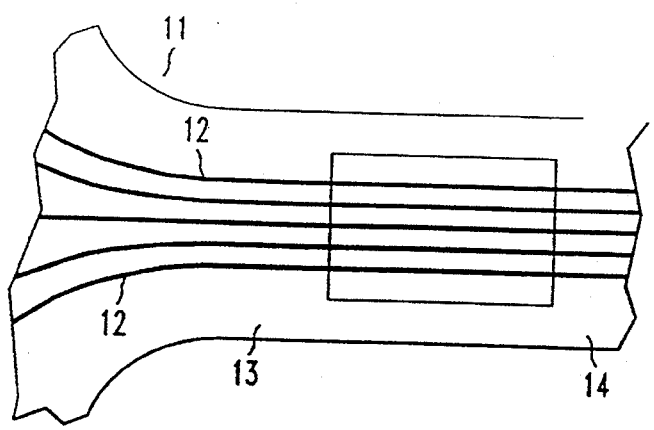
FIG. 1 is a schematic view of part of an optical backplane to which a connector is to be applied.

Referring now to FIG. 1, there is shown an output port of an optical backplane comprising a flexible plastic substrate 11 upon which have been adhered a plurality of optical fibers 12. An aperture has been made in the substrate 11 such that the optical fibers extend across the aperture between opposite substrate segments 13 and 14. In accordance with the aforementioned Shahid '981 patent, connectors can be applied to the output port of FIG. 1 by applying, on opposite sides of the optical fibers 12, first and second optical fiber support members 16 and 17, as shown in FIG. 2.

Figure 3:
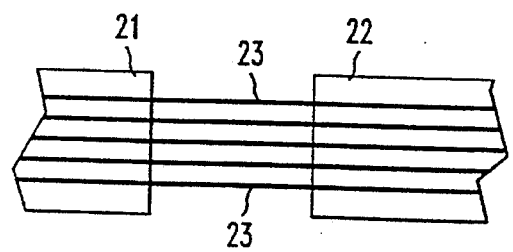
FIG. 3 is a schematic view of part of an optical fiber ribbon to which a connector is to be applied.

The support members 16 and 17 are conventionally made of a monocrystalline material, such as silicon, into which opposing V-grooves can be made with precision by photolithographic masking and etching. Etching of the material inherently progresses along crystallographic planes, which permits features to be formed with precise predictability. The support members 16 and 17 are also shown as having alignment grooves 18 and 19 on the sides thereof, which permit the mounting of alignment pins with a spring clip, as is described in the U.S. patent of Bonanni, U.S. Pat. No. 4,818,058, granted Apr. 4, 1989, incorporated by reference herein (see especially FIG. 4 thereof). After the assembly shown in FIG. 2, the support members 16 and 17 and the optical fibers 12 may be severed by cutting transversely to the optical fibers, as described in the Shahid '981 patent, to provide a connector surface that can be subsequently connected or abutted to a similar connector surface of another connector for optical fiber interconnection. The aforementioned Shahid '426 patent describes how this technique can be applied to optical fiber ribbons, as shown in FIG. 3, in which an optical fiber ribbon comprises two displaced substrate portions 21 and 22 which are bridged by the optical fibers 23 that adhere to the substrate portions 21 and 22.

Figure 2:
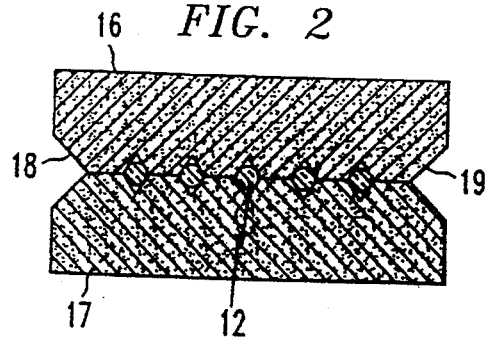
FIG. 2 is a schematic view of a connector that can be used for containing the optical fibers of FIG. 1.

The invention provides for machine placement of opposite optical fiber support elements of the type shown in FIG. 2. As will become clear later, machine placement of the support members is greatly facilitated by making them of plastic, rather than silicon. In particular, injection molding is used to make the opposite segments, which is a much less expensive process than masking and etching, and allows the formation of structural features such as right-angle steps needed for precise alignment and placement.

Figure 4:
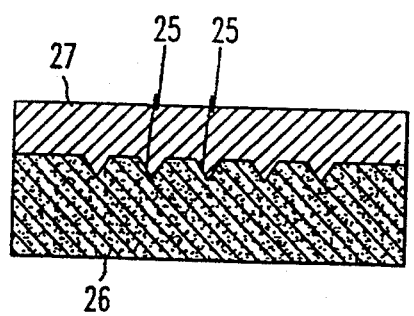
FIG. 4 is a schematic view of apparatus for making a plastic mold for making optical fiber connectors in accordance with one embodiment of the invention.

As illustrated in FIG. 4, the first step in this procedure is to make an array of V-grooves 25 in a monocrystalline body 26 such as silicon, by the conventional masking and etching process. This defines the V-grooves with the requisite precision. However, to allow for shrinkage of the plastic during the subsequent molding process, the V-grooves should be made somewhat larger than is finally intended for the final optical fiber support. A metal layer 27 is then electroformed over the V-grooves; thereafter, the silicon body 26 is removed or destroyed, as by etching it in, for example, a mixture of HF, $HNO_3$ find water (other known etchants of silicon could alternatively be used). The metal layer 27 is then used as an insert in a mold which defines the remaining configuration of the support members. That is, fiber support members are made by injection molding, using a mold having the metal layer insert in the portion of the mold defining the V-grooves of the support members being made.

Figure 5:
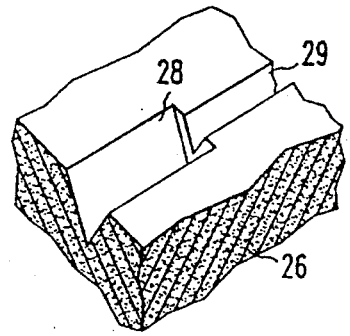
FIG. 5 is a perspective view of part of a V-groove of an optical fiber connector in accordance with one embodiment of the invention.

The optical fibers 12, to be supported as shown in FIG. 2, may be conventional glass optical fibers having a diameter of one hundred twenty-five microns. They may also be conventional glass fibers which are coated with a thin layer of polyimide to give them a total diameter of one hundred forty-five microns. If the optical fibers are coated with acrylate to have a total diameter of about two hundred fifty microns, as is often done for giving optical fibers greater protection, it will normally be necessary to strip the acrylate coating prior to mounting in a V-groove because such coatings are not dependably symmetrical with respect to the optical fiber; that is, the optical fiber core may be somewhat off-center with respect to the center of the acrylate coating, which will not allow proper mating to an abutting fiber for giving dependable interconnection. In such event, it is recommended that part of the V-groove be made sufficiently small to accommodate the stripped fiber and part of it be made larger to accommodate the coated fiber. This is illustrated in FIG. 5 in which V-groove portion 29 is sufficiently small to support an uncoated optical fiber, while the V-groove portion 28 supports the coated portion of the fiber. By supporting the coated portion in the optical fiber supporting member 26, as shown in FIG. 5, one avoids stresses on the fiber that would otherwise occur.

Figure 6:
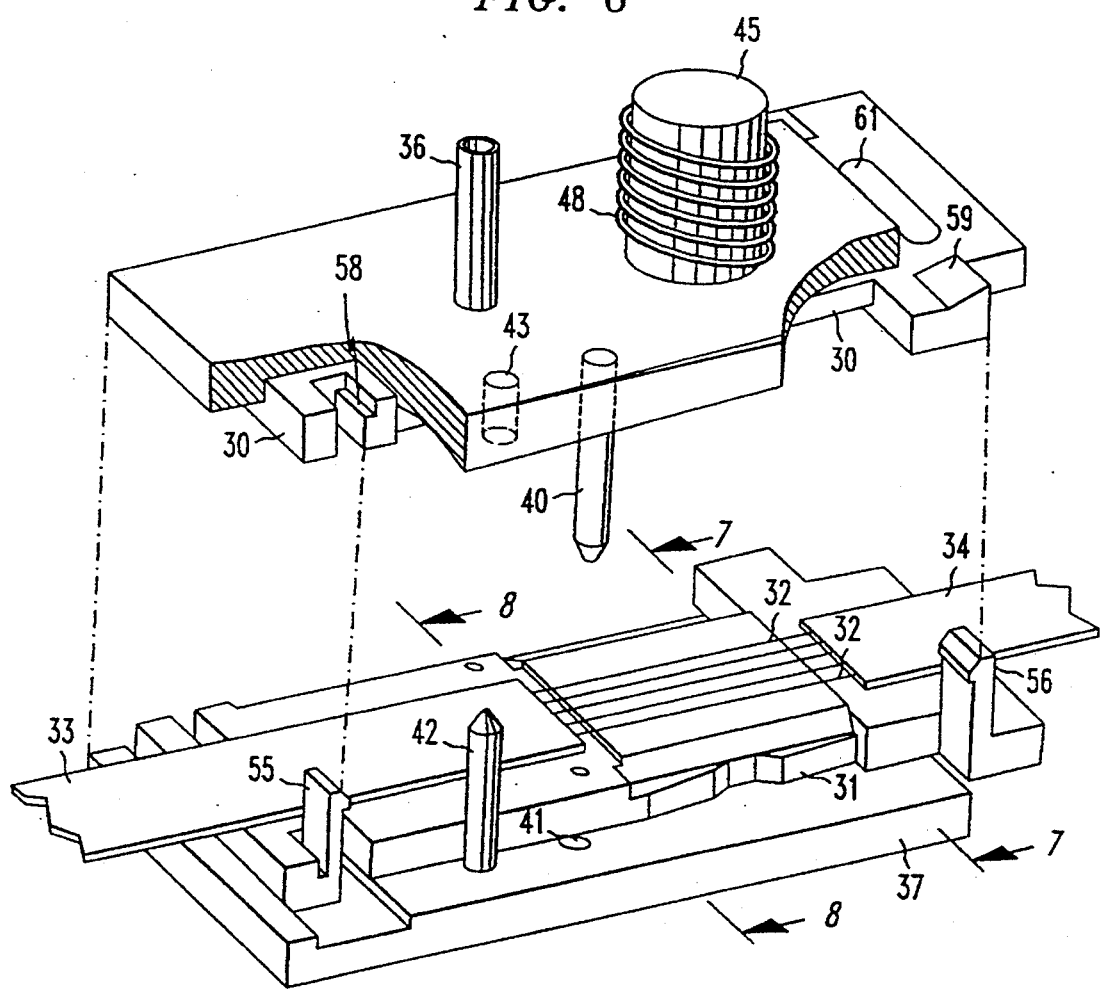
FIG. 6 is a schematic view of apparatus for applying connectors to an optical fiber ribbon in accordance with one embodiment of the invention.
Figure 7:
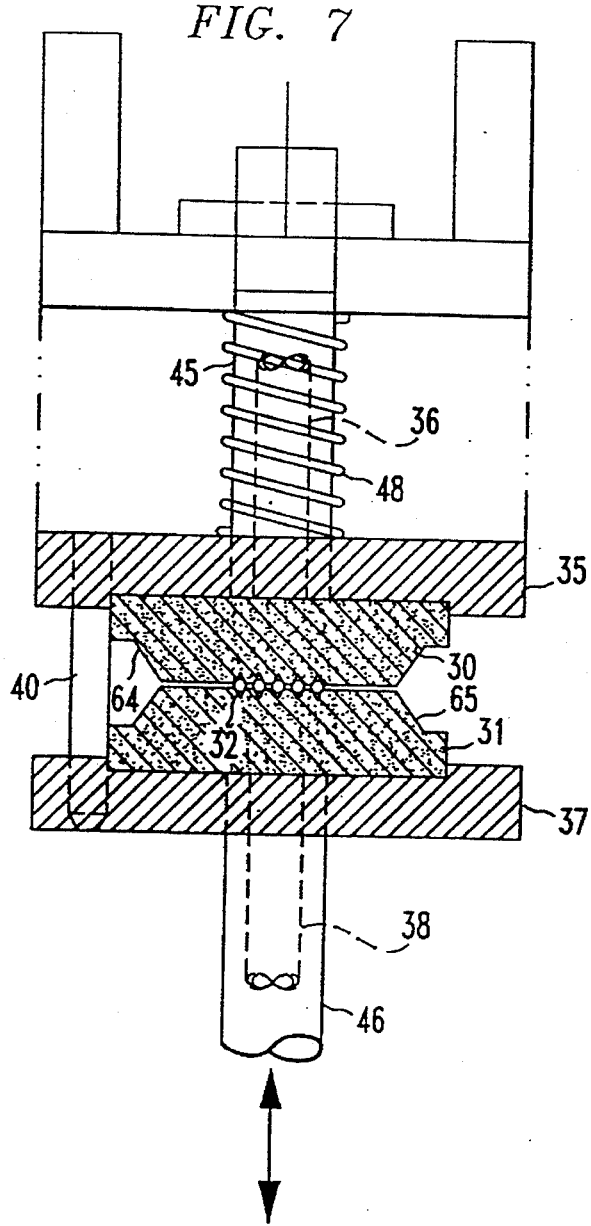
FIG. 7 is a sectional view taken along lines 7—7 of FIG. 6.

Referring to FIGS. 6 and 7, there is shown two optical fiber support members 30 and 31 located on opposite sides of an array of optical fibers 32 which are suspended between portions 33 and 34 of an optical fiber ribbon, as described with reference to FIG. 3. Support members 30 and 31 are of plastic and have been made by injection molding, as described above. The support members have matching V-grooves, each for containing one optical fiber, as shown mote clearly in FIG. 7. FIG. 6 shows the support members 30, 31 spaced apart prior to clamping on opposite sides of the optical fibers 32, while FIG. 7 shows the support members in their abutted positions.

The support member 30 is held within a vacuum chuck or fixture 35 by a vacuum applied through a duct 36. Similarly, support member 31 is held within a vacuum chuck 37 by a vacuum applied by means of duct 38. Vacuum chuck 37 has an alignment pin 42 and alignment aperture 41 while vacuum chuck 35 has an alignment pin 40 and alignment aperture 43. The optical fiber ribbon 33, 34 is supported by an X-Y stage (not shown) which places the fibers 32 between the support members 30 and 31 in alignment with matching V-grooves.

As shown in FIG. 7, press members 45 and 46 compress together support members 30 and 31 on opposite sides of the fiber so that each optical fiber 32 is contained within matching V-grooves of the two support members. A spring 48 on press member 45 limits the compressive force that can be applied to the support members 30 and 31 to avoid possible damage to the fibers or support members. As the two support members are being brought together, the alignment pins 40 and 42 respectively engage alignment apertures 41 and 43 to increase the precision with which support members are aligned.

Figure 8:
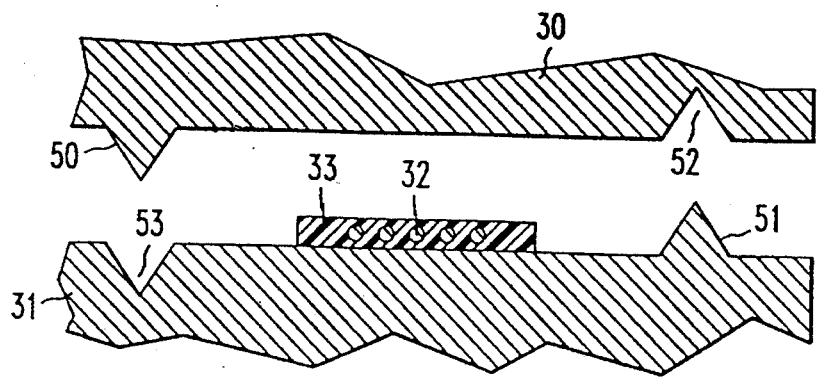
FIG. 8 is a fragmentary sectional view taken along lines 8—8 of FIG. 6.

Referring to FIG. 8, much smaller alignment projections 50 and 51 are included on the plastic support members 30 and 31 and respectively engage alignment apertures 52 and 53. The projections 50 and 51 and apertures 52 and 53 are made to be conical and are much smaller than alignment pins 40 and 42 in order to give finer precision alignment in the abutment of optical fiber support members 30 and 31. Illustratively, the maximum diameter of each projection 50 and 51 is less than one-tenth the diameter of alignment pins 40 and 42. Finally, the fibers 32 of FIG. 7 provide even finer alignment in that they tend to center themselves in abutting V-grooves as the support members 30 and 31 are pressed together.

The lower support member 31 is also made to include latch members 55 and 56 shown in FIG. 6. Latch member 55 is adapted to engage a latch step 58 of the upper support member 30, while latch member 56 is adapted to engage a latch step 59 in support member 30. The upper surfaces of latch members 55 and 56 are each curved to constitute a cam surface which deflects the latch member when it is brought in contact with the upper support member 30. When the support members 30 and 31 have been compressed together sufficiently, the inherent spring bias in the latch members 55 causes them to engage the step portions 58 and 59, thereby to lock together the upper and lower support members 30 and 31. Consequently, immediately after latching, the vacuum chucks 35 and 37 of FIG. 7 can be withdrawn, and the upper and lower support members 30 and 31 will remain firmly clamped against the optical fibers 32.

Figure 9:
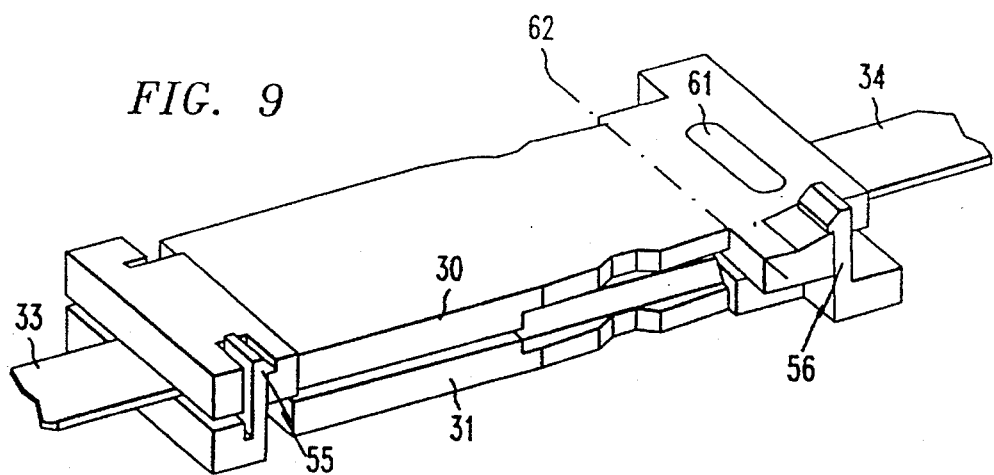
FIG. 9 is a perspective schematic view of an assembled optical fiber connector in accordance with one embodiment of the invention.

FIG. 9 shows the completed assembly comprising the two support members 30 and 31 on opposite sides of the optical fibers extending between optical fiber ribbon segments 33 and 34. Latches 55 and 56 hold the assembly together with each of the optical fibers 32 contained within matching pairs of V-grooves, as shown in FIG. 7. The upper support member 30 contains an opening 61 into which liquid adhesive may be applied. With the adhesive being of a proper viscosity, it contacts the optical fibers 32 shown in FIG. 6 and propagates by capillary action along the optical fibers 32. Referring to FIG. 7, the adhesive also travels by capillary action along the tiny space between the support members 30 and 31. Thereafter, the adhesive is allowed to cure and bond together support members 30 and 31 and optical fibers 32; it should be noted that during this period the assembly has been removed from the machine apparatus of FIGS. 6 and 7, thus enabling the apparatus to be used for other purposes.

After the adhesive has cured, the bonded support members 30 and 31 and the intervening optical fibers are cut along a vertical plane 62 (FIG. 9), in the manner described in the Shahid '981 patent. The latch 56 is therefore cut away from the remaining assembly, but it is no longer needed because the support members and optical fibers have been bonded by the adhesive. The exposed ends of the optical fibers are then polished, and an alignment clip is placed around the assembly, as shown in FIG. 4 of the Bonanni patent. The clip holds alignment pins pressed against opposite sides of the support members 30 and 31. Referring to FIG. 7, one alignment pin is pressed against a V-groove 64 and the other pin against an opposite V-groove 65. The alignment pins pressed against sides 64 and 65 then allow the assembly to be used as a connector, that is, to be mated to an abutting connector for allowing transmission of light energy from the optical fibers of one connector to the optical fibers of the mating connector.

Figure 10:
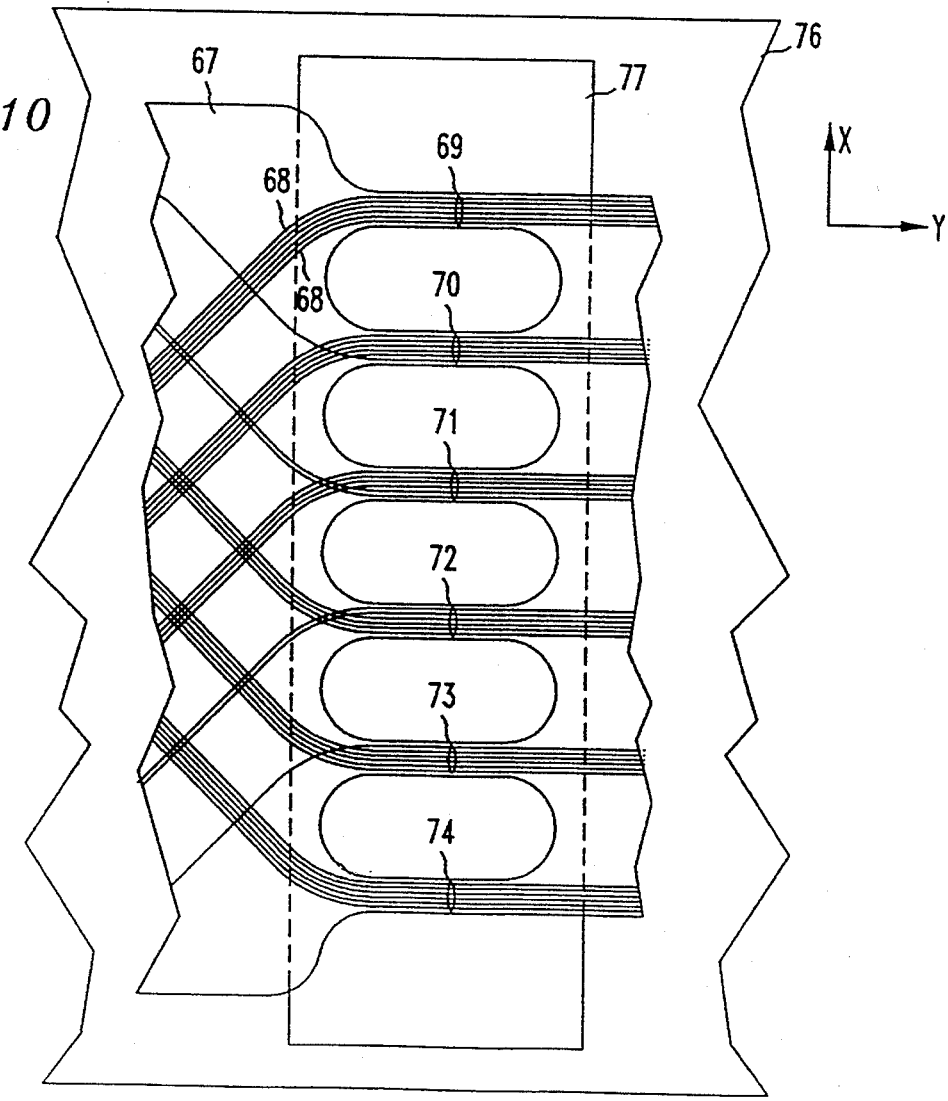
FIG. 10 is a top view of apparatus for applying connectors to an optical backplane in accordance with another embodiment of the invention.

FIG. 10 is a fragmentary top view of apparatus for applying connectors to an optical backplane 67 to which are adhered optical fibers 68 that have been routed such as to form output ports 69–74. The manner in which the optical fibers may be routed is described in detail in the patent of Burack et at., U.S. Pat. No. 5,259,051, granted Nov. 2, 1993, incorporated herein by reference. FIG. 7 of the Burack et al. patent shows why the output ports are formed as shown in the present FIG. 10. The optical backplane 67 is supported on a flat carrier plate 76 having therein an aperture 77 which the output ports 69–74 overlie. Each output port in turn has an aperture in its substrate, as shown in FIG. 1. The carrier plate is mounted on an X-Y stage (not shown) of a type known in the art which is capable of moving it in X and Y directions shown.

Connectors are successively applied to the output ports by the apparatus of FIGS. 6 and 7 which has access to opposite sides of the optical fibers by virtue of the aperture 77 in the carrier plate 76. After connectors have been applied to output ports 69 as has been described, the plate 76 is moved in the X direction so that output port 70 lies between the opposite vacuum chucks. Connector support members 30 and 31 are loaded in the vacuum chucks and then applied to the fibers of output port 70. In this manner, connectors are successively applied to all of the output ports by moving the X-Y stage successively in the positive X direction. The Burack et al. patent explains how all of the optical fibers 68 may initially be made of a single fiber to allow a single test to determine optical transmission characteristics of the fiber. With the present procedure, all of the support members can be applied prior to the test, with the fiber being severed after the test.

It can be appreciated that if a large number of identical optical backplanes are to be made, the process of applying connectors is greatly expedited by the use of the invention. Large numbers of support members identical to support members 30 and 31 are made by injection molding. They can be loaded into a magazine, which has not been shown, for feeding support members 30 and 31 automatically to the vacuum chucks to avoid manual placement of the plastic support members after each operation. With a magazine thus provided for feeding the support members, the application of the connectors can be completely automated. Programming the operation of known X-Y stages to move the plate 76 sequentially with the precision required for each successive clamping operation is well within the skill of the worker in the art. The unique use of alignment pins and projections, as described before, insures actual alignment of the matching V-grooves with the individual optical fibers.

Known injection molding techniques provide the various surface features needed for abutment, for example, against the vacuum chucks 35 and 37 in a way that would be difficult if one were using materials such as silicon. The use of plastic also allows the fabrication of the conical alignment projections 50 and 51 and alignment apertures 52 and 53. Clearly, the latches 55 and 56 could not be incorporated as shown if the support members were made of material such as silicon. Techniques for making an appropriate mold for support member fabrication are known to workers in the art and described, for example, in the book, "Plastics Engineering Handbook of the Society of the Plastics Industry, Inc.," Michael L. Barons, editor, *Van Nostrand Reinhold*, New York, 1991. The use of a mold insert such as the metal member 27 of FIG. 4 is a well-known practice.

We have found that polyphenylene sulfide (PPS), polyetherimide and liquid crystal polymers, with appropriate fillers, have a relatively low mold shrinkage and could be used as the plastic material. The preferred material is PPS which has a shrinkage of approximately 0.4 percent below the dimensions of the original silicon masters. Consequently, the dimensions of the silicon masters should be approximately 0.4 percent greater than the final desired dimension. For bonding the support members 30 and 31 together, any of various adhesives can be used, such as Epo-Tek 353ND, commercially available from Epoxy Technology, Inc., Billerica, Mass., which has an appropriate viscosity for allowing transport by capillary action, as described above.

The various embodiments described are intended merely to illustrate the inventive concepts involved. For example, a succession of optical fiber ribbons could be used in the apparatus of FIG. 10, rather than the succession of output ports 69–74. As described in the Shahid '981 patent, two abutting connectors can be simultaneously made by the apparatus of FIGS. 6 and 7 such that, referring to FIG. 9, they are separated by the cut along plane 62.

While electroforming has been described for depositing metal layer 27 of FIG. 4, other deposition methods such as vapor deposition could alternatively be used. Molding processes other than injection molding can be used for making support members 30 and 31. Clamping arrangements other than latches 55 and 56 of FIG. 9 could alternatively be used. The adhesive can be applied before the support members 30 and 31 are pressed together, if desired. Various other embodiments and modifications may be made by those skilled in the art without departing from the spirit and scope of the invention.

We claim:

1. A method for making an optical fiber connector comprising:

making an array of first V-grooves in monocrystalline material by photolithographic masking and etching;

depositing metal on the array of first V-grooves;

removing the monocrystalline material, thereby to form a metal member having therein an array of second V-grooves;

and using the metal member as a mold portion for making, by injection molding, a support member of plastic having an array of third V-grooves on one surface thereof, each V-groove being adapted to support therein an optical fiber and the array of third V-grooves being smaller than the array of first V-grooves by a predetermined amount depending upon the shrinkage characteristics of the material of the support member.

2. The method of claim 1 wherein:

the support member is made of a material selected from the group consisting of polyphenylene sulfide, polyetherimide, and liquid crystal polymers.

3. The method of claim 2 wherein:

the support member is made of polyphenylene sulfide;

and the first V-grooves made in the monocrystalline material are 0.4 percent larger than the third V-grooves of the support member.

4. The method of claim 3 wherein:

the support member made by injection molding is a first support member; and further comprising:

making a second support member by injection molding, the second support member having V-grooves defined in plastic that are substantially identical to the third V-grooves;

and fitting the first and second support members on opposite sides of an optical fiber array such that each optical fiber is contained between opposite V-grooves of the first and second support members.

5. The method of claim 4 wherein:

the step of injection molding the first support member comprises the step of forming in the first member a latch member;

the step of injection molding the second support member comprises the step of forming in the second member a latch step;

and wherein the fitting step comprises engaging the latch member to the latch step.

6. The method of claim 4 wherein:

an alignment projection of a conical configuration is formed in the first support member;

an alignment aperture of a conical configuration of the same dimension as that of the alignment projection is formed in the second support member;

the alignment projection being fitted into the alignment aperture when the two support members are located on opposite sides of the optical fiber array.

7. The method of claim 5 wherein:

the latch member comprises an upper cam surface that is engaged when the first and second support members are forced together, said upper cam surface deflecting the latch member, the latch member thereafter engaging the latch step and being forced against the latch step by a spring bias.

\* \* \* \* \*